(12) United States Patent
Nilsson et al.

(10) Patent No.: US 10,703,184 B2
(45) Date of Patent: Jul. 7, 2020

(54) HYDRAULIC SYSTEM

(71) Applicant: BorgWarner Sweden AB, Landskrona (SE)

(72) Inventors: Kristoffer Nilsson, Lund (SE); Henrik Nilsson, Eslöv (SE); Gustaf Lagunoff, Umeå (SE); Mikael Tiainen, Lindome (SE); Johan Nilsson, Huskvarna (SE)

(73) Assignee: BorgWarner Sweden AB, Landskrona (SE)

( * ) Notice: Subject to any disclaimer, the term of this patent is extended or adjusted under 35 U.S.C. 154(b) by 63 days.

(21) Appl. No.: 15/512,239

(22) PCT Filed: Sep. 21, 2015

(86) PCT No.: PCT/EP2015/071603
§ 371 (c)(1),
(2) Date: Mar. 17, 2017

(87) PCT Pub. No.: WO2016/042170
PCT Pub. Date: Mar. 24, 2016

(65) Prior Publication Data
US 2017/0291481 A1    Oct. 12, 2017

(30) Foreign Application Priority Data

Sep. 19, 2014 (SE) ........................ 1451106
Mar. 13, 2015 (SE) ........................ 1550307

(51) Int. Cl.
*B60K 1/00* (2006.01)
*F16H 61/30* (2006.01)
(Continued)

(52) U.S. Cl.
CPC ................ *B60K 1/00* (2013.01); *B60K 17/10* (2013.01); *B60K 23/04* (2013.01);
(Continued)

(58) Field of Classification Search
CPC .......... B60K 1/00; B60K 23/04; B60K 17/10; B60K 2001/006; B60K 2023/043;
(Continued)

(56) References Cited

U.S. PATENT DOCUMENTS 3,704,768 A * 12/1972 Hirozawa ............... F16H 61/30
                                                    192/3.57
3,938,409 A *  2/1976 Uozumi ............. F16H 61/0025
                                                    477/159
(Continued)

FOREIGN PATENT DOCUMENTS

CN    101487531 A    7/2009
CN    102077000 A    5/2011
(Continued)

OTHER PUBLICATIONS

Chinese Office Action dated Oct. 25, 2018 ; Application No. 201580050697.6; Applicant: BorgWarner Sweden AB; 8 pages.
(Continued)

*Primary Examiner* — Paul N Dickson
*Assistant Examiner* — Timothy Wilhelm
(74) *Attorney, Agent, or Firm* — Young Basile Hanlon & MacFarlane, P.C.

(57) ABSTRACT

A hydraulic system (10) for a vehicle is provided. The hydraulic system comprises a shifting mechanism (20) and a pump assembly (30) configured to provide pressurized fluid to said shifting mechanism (20), and an electrical motor (40). The movement of the shifting mechanism (20) controls a valve function which serves to open a connection from the pump assembly (30) to the electrical motor (40).

10 Claims, 6 Drawing Sheets

(51) Int. Cl.
 *F16H 61/00* (2006.01)
 *B60K 17/10* (2006.01)
 *B60K 23/04* (2006.01)
 *B60K 6/52* (2007.10)
 *B60K 6/48* (2007.10)
 *B60K 6/26* (2007.10)

(52) U.S. Cl.
 CPC ......... *F16H 61/0031* (2013.01); *F16H 61/30* (2013.01); *B60K 6/26* (2013.01); *B60K 6/48* (2013.01); *B60K 6/52* (2013.01); *B60K 2001/006* (2013.01); *B60K 2023/043* (2013.01)

(58) Field of Classification Search
 CPC ......... B60K 6/26; B60K 6/48; F16H 61/0031; F16H 61/30; B60Y 2200/92; B60G 2300/50
 See application file for complete search history.

(56) References Cited

U.S. PATENT DOCUMENTS

| | | | | |
|---|---|---|---|---|
| 4,004,417 A * | 1/1977 | Woody | ............... | B62D 11/183 192/3.31 |
| 5,924,539 A * | 7/1999 | Braun | ............... | F16H 61/0276 137/625.64 |
| 6,102,362 A * | 8/2000 | Gerber | ............... | F15B 11/046 137/596.14 |
| 6,306,061 B1 * | 10/2001 | Inamura | ............... | F16H 61/14 477/45 |
| 6,565,473 B2 * | 5/2003 | Endo | ............... | B60K 6/48 475/117 |
| 6,695,589 B1 * | 2/2004 | Dougan | ............... | F16H 61/0021 141/59 |
| 6,877,577 B1 * | 4/2005 | Smith | ............... | B60K 6/12 180/197 |
| 7,325,885 B2 * | 2/2008 | Berger | ............... | F16D 48/02 137/625.64 |
| 7,578,761 B2 * | 8/2009 | Nishikawa | ............... | B60K 6/387 475/127 |
| 7,806,796 B2 * | 10/2010 | Zhu | ............... | B60K 6/48 475/73 |
| 7,909,729 B2 * | 3/2011 | Tanaka | ............... | F16D 48/066 192/103 F |
| 7,946,389 B2 * | 5/2011 | Kakinami | ............... | F16H 57/04 123/196 R |
| 8,187,151 B2 * | 5/2012 | Gloge | ............... | F16H 61/0031 477/159 |
| 8,419,579 B2 * | 4/2013 | Rosemeier | ............... | B60K 6/48 475/150 |
| 8,517,890 B2 * | 8/2013 | Hayashi | ............... | B60K 6/445 477/3 |
| 8,667,859 B2 * | 3/2014 | Engel | ............... | F16H 61/30 74/473.11 |
| 8,667,885 B2 * | 3/2014 | Schmidt | ............... | F16H 61/0206 60/461 |
| 8,857,188 B2 * | 10/2014 | Noda | ............... | B60K 6/48 123/179.25 |
| 8,857,382 B2 * | 10/2014 | Yagasaki | ............... | F16H 61/0025 123/2 |
| 8,974,347 B2 * | 3/2015 | Shimizu | ............... | F16H 61/0206 417/416 |
| 9,475,484 B2 * | 10/2016 | Fushiki | ............... | B60K 6/46 |
| 9,739,374 B2 * | 8/2017 | Kanehara | ............... | F16H 61/0021 |
| 9,908,434 B2 * | 3/2018 | Konishi | ............... | B60K 7/0007 |
| 10,030,755 B2 * | 7/2018 | Severinsson | ............... | B60K 6/48 |
| 10,059,323 B2 * | 8/2018 | Ando | ............... | B60K 6/52 |
| 2002/0105225 A1 | 8/2002 | Endo et al. | | |
| 2005/0064975 A1 * | 3/2005 | Takagi | ............... | F16H 61/0031 475/101 |
| 2008/0000746 A1 * | 1/2008 | Schiele | ............... | B60K 6/387 192/3.54 |
| 2011/0088990 A1 * | 4/2011 | Shimizu | ............... | F16H 61/0206 192/85.01 |
| 2013/0152570 A1 | 6/2013 | Hoshinoya et al. | | |
| 2018/0058597 A1 * | 3/2018 | Kanstad | ............... | E21B 43/01 |

FOREIGN PATENT DOCUMENTS

| | | |
|---|---|---|
| CN | 102341622 A | 2/2012 |
| CN | 103419622 A | 12/2013 |
| CN | 103717946 A | 4/2014 |
| CN | 103790875 A | 5/2014 |
| WO | 2010/101506 A1 | 9/2010 |
| WO | 2015/114124 A1 | 8/2015 |

OTHER PUBLICATIONS

Chinese Office Action dated Oct. 11, 2019; Application No. 201580050697.6; Applicant: BorgWarner Sweden AB; 10 pages.

\* cited by examiner

HYDRAULIC SYSTEM

This application claims the benefit of Swedish Application Nos. 1451106-7 filed Sep. 19, 2014, 1550307-1 filed Mar. 13, 2015 and PCT Application No. EP2015/071603 filed Sep. 21, 2015.

TECHNICAL FIELD

The present invention related to a hydraulic system for a vehicle. More particularly, the present invention relates to a hydraulic system for actuating a shifting mechanism of a vehicle driveline.

BACKGROUND

In modern four wheeled vehicles, such as cars, electrical motors may provide an alternative to the traditional combustion engines, as well as providing additional control of drive torque distribution by so called torque vectoring.

In case where the electrical motor is providing driving torque, such electrical propulsion motors may be arranged as the only driving unit of the vehicle, or in series or in parallel with a combustion engine thus forming a so called hybrid vehicle.

One example of a driving configuration including an electrical driving motor, as well as a torque vectoring motor, is described in WO02010101506 by the same applicant.

The electrical power system of today's passenger cars is normally based on 12V. Due to the relatively low voltage proposed solutions for high electrical power utilities, such as electrically powered propulsion units, require additional power supplies and high power electronics.

During recent years there is a trend of replacing the 12V system with an electrical power system being based on 48V. As the electrical power increases new and improved solutions may be applicable, replacing the previous solutions requiring additional high power electronics.

The above-mentioned prior art driving configuration includes a high power electrical motor for propulsion purposes, and a smaller electrical motor for torque vectoring purposes. Should 48V be available, it would be possible to develop a design for hybrid drive using only a single electrical motor, as well as a transmission being configured to be shifted between a first mode in which the electrical motor is used as a secondary drive source for propulsion, and a second mode in which the electrical motor is used for redistributing driving torque (i.e. from the primary drive).

An electrical motor, either used for propulsion, torque vectoring, or both, may be equipped with hydraulically actuated gears in order to provide a wider range of operating parameters of the electrical motor, e.g. with respect to torque output and rotational speed.

In addition to this, there is also a need for cooling the electrical machine. This may be done by supplying oil to the electrical machine, in which the cooling oil is circulated around the rotating parts of the electrical machine.

The use of a shifting mechanism for actuating a gear switch, as well as an electrical motor for propulsion, torque vectoring, or both requires two hydraulic systems. In order to reduce complexity and costs it would therefore be advantageous with a single hydraulic system capable of providing gear switch as well as cooling.

SUMMARY

Accordingly, the present invention preferably seeks to mitigate, alleviate or eliminate one or more of the above-identified deficiencies in the art and disadvantages singly or in any combination and solves at least the above-mentioned problems by providing a method and a device according to the appended claims.

An idea is to solve the above mentioned drawbacks by providing a hydraulic system which serves to actuate gears by means of a shifting mechanism, which shifting mechanism forms part of a valve which when open allows the hydraulic fluid to cool the electrical motor.

According to a first aspect, a hydraulic system for a vehicle is provided. The system comprises a shifting mechanism and a pump assembly configured to provide pressurized fluid to said shifting mechanism, and an electrical motor. The movement of the shifting mechanism controls a valve function which serves to open a connection from the pump assembly to the electrical motor.

In an embodiment, the shifting mechanism comprises a movable shifting piston such that the connection from the pump assembly to the electrical motor is opened only when the shifting piston has reached one of its end positions.

The hydraulic system may further comprise a pilot valve arranged between the shifting mechanism and the electrical motor.

The pilot valve may be configured to open when the shifting piston has reached one of its end positions.

In an embodiment, the hydraulic system comprises at least one separate valve being responsive to the movement of the shifting piston.

The at least one separate valve may be integrated in said shifting piston.

In an embodiment, the pump assembly comprises a reversible pump.

In another embodiment, the shifting mechanism comprises a detention device for keeping the shifting mechanism at a desired shift position.

The detention device may comprise a plurality of distinct shift positions being separated by a ramped surface.

According to a second aspect, a vehicle driveline is provided. The vehicle driveline comprises a hydraulic system according to the first aspect.

BRIEF DESCRIPTION OF DRAWINGS

The invention will be described in further detail under reference to the accompanying drawings in which.

DETAILED DESCRIPTION

Figure 1:
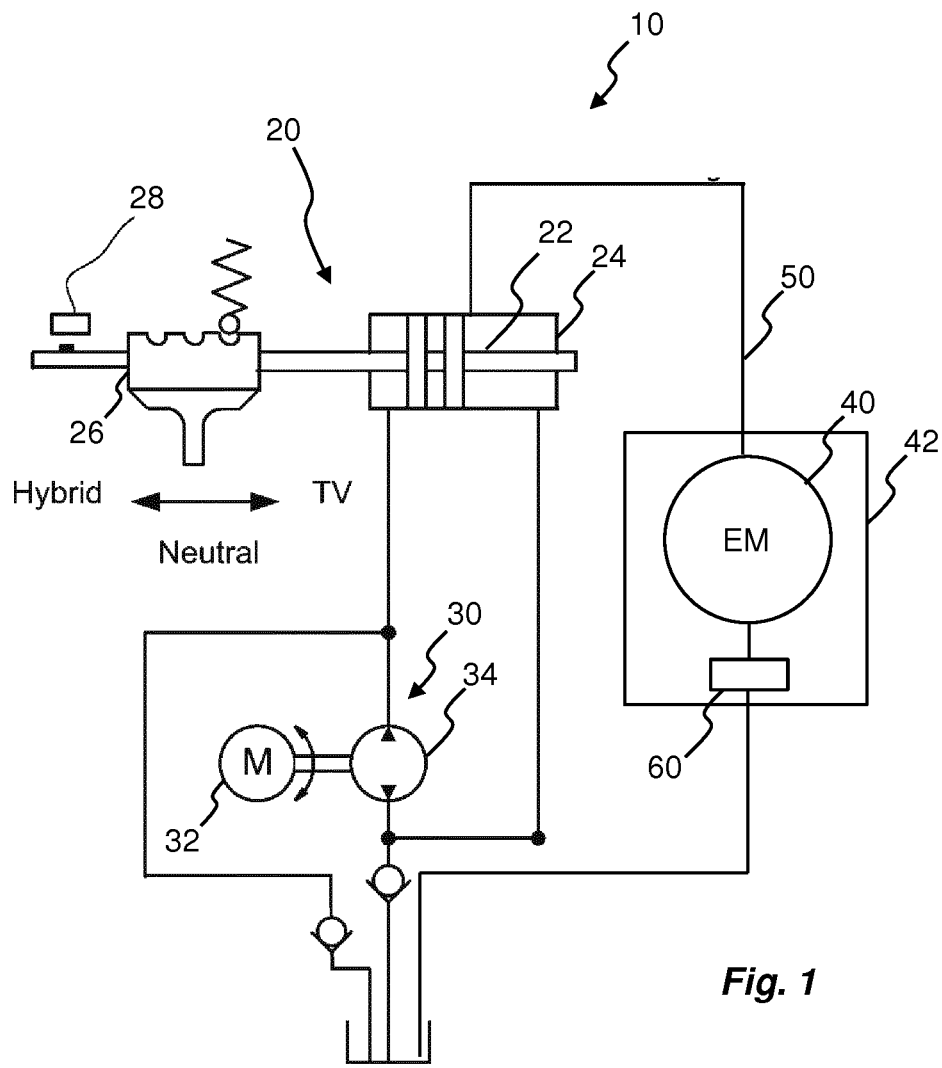
FIG. 1 is a schematic view of a hydraulic system according to an embodiment.

In the following, various examples of hydraulic systems will be described. Common for all systems is that a the hydraulic system includes a shifting mechanism and a pump assembly configured to provide pressurized fluid to said shifting mechanism, as well as an electrical motor. The hydraulic system is configured such that the movement of the shifting mechanism controls a valve function which serves to open a connection from the pump assembly to the electrical motor, wherein hydraulic fluid may flow to the electrical motor for cooling of the electrical motor.

Before turning into details of the hydraulic system some general comments on suitable applications will be given briefly. The hydraulic system described below may e.g. be implemented in a driveline configuration having torque vectoring functionality, electric drive functionality, or both. The driveline configuration may be constructed such that:
  i) The driveline can be operated in at least one of two modes, of which one mode corresponds to a torque vectoring mode, and one mode corresponds to a driving mode;
  ii) The hydraulic system comprises a single motor which is connectable to a differential mechanism according to at least two different transmissions, wherein the different transmissions correspond to the different modes;
  iii) The driveline may be implemented in vehicles, such as passenger cars, in many different ways as well as for many different types of driving configurations.

Hybrid drive is normally desired for passenger cars or other four-wheeled vehicles. Hybrid drive may either represent the possibility to change driving source from an internal combustion engine to an electrical motor or vice versa, or the possibility to use an electrical motor driving a front or rear axle, in addition to an internal combustion engine driving the other one of the front or rear axle, in order to provide all wheel drive.

One typical example of a driveline configuration for which the torque vectoring device is particularly applicable is a four wheeled vehicle, such as a passenger car, having an internal combustion engine driving the front axle, and an electrically driven rear axle. The rear axle is driven by means of an electrical motor forming part of a hydraulic system according to any of the embodiments described herein, and the vehicle may be driven by the internal combustion engine only (i.e. front wheel drive), the electrical motor only (i.e. rear wheel drive), or the internal combustion engine in combination with the electrical motor (i.e. all wheel drive). As will be understood, the electrical motor may provide torque vectoring when the internal combustion engine is driving the vehicle.

It should be understood that various driveline configurations are applicable for the electrical motor of the present application; e.g. the hydraulic system could be used with an all-electric vehicle, only for providing one of the modes described above, or it may be arranged on the front axle instead of the rear axle, etc.

Another application is a driveline where the electrical motor is used only for torque vectoring.

The shifting mechanism is provided in order to shift mode; in cases where the electrical motor is configured to only provide torque vectoring the shifting mechanism changes the mode between neutral (i.e. the electrical motor is disconnected from torque vectoring mode) and engaged (i.e. the electrical motor is connected to torque vectoring mode). In cases where the electrical motor is configured to only provide driving torque, i.e. propulsion, the shifting mechanism changes the mode between neutral (i.e. the electrical motor is disconnected from propulsion mode) and engaged (i.e. the electrical motor is connected to propulsion mode). Additional modes may be available in case speed reduction stages are available for the electrical motor, whereby the shifting mechanism may change mode between neutral, high speed mode, and low speed mode. In cases where the electrical motor is configured to provide either driving torque or torque vectoring the shifting mechanism changes the mode between neutral (i.e. the electrical motor is disconnected from propulsion as well as torque vectoring), torque vectoring mode, and propulsion mode. For such embodiment additional modes may be available in case speed reduction stages are available for the electrical motor, whereby the shifting mechanism may change mode between neutral, high speed mode, low speed mode, and torque vectoring mode.

By using a pump for both actuation and for cooling considerable cost, weight and space savings can be made.

Now turning to FIG. 1 an embodiment of a hydraulic system 10 will be described. The hydraulic system 10 comprises a shifting mechanism 20, a pump assembly 30 acting as a pressure source, and an electrical motor 40 configured to provide torque vectoring, propulsion, or both in accordance with the description above.

The pump assembly 30 is a reversible pump assembly, including an electric motor 32 and a pumping device 34. The reversible pump assembly 30 is used to actuate the shifting mechanism 20 in either one of two possible directions. The reversible pump assembly 30 is not described in further details herein, but may be implemented in accordance with PCT/SE2015/052024 of the same applicant.

The shifting mechanism 20 comprises a movable shifting piston 22 arranged inside a cylinder 24, and a detention device 26 which is movable with the shifting piston 22. The shifting piston 22 and the detention device 26 are movable between either one of three positions, corresponding to neutral mode, hybrid mode, and torque vectoring (TV) mode. A position sensor 28 may be provided to monitor the current position of the shifting piston 22.

The detention device 26 is used to keep the shifting piston 22 in the selected position (Hybrid/Neutral/TV) also if the pump assembly 30 is shut off.

When the pump assembly 30 is started hydraulic fluid of a certain pressure will flow into the cylinder 24 on a first side of the piston 22, leading to a movement of the shifting piston 22 inside the cylinder 24. If the pump assembly 30 is driven in the opposite direction hydraulic fluid of a certain pressure will flow into the cylinder 24 on a second side of the piston 22, leading to a movement of the shifting piston 22 inside the cylinder 24 in an opposite direction. Once the shifting piston 22 has reached one of its end positions openings in the piston cylinder 24 will allow the pump flow to enter a cooling circuit 50 where it can be used to cool the electrical motor 40 and for lubrication of the electrical motor 40.

The return flow of warm oil can optionally pass a heat exchanger 60 before returning to the tank. The heat exchanger 60 can be of oil/air type and be integrated into the electric motor housing 42 as shown in FIG. 1.

Figure 2:
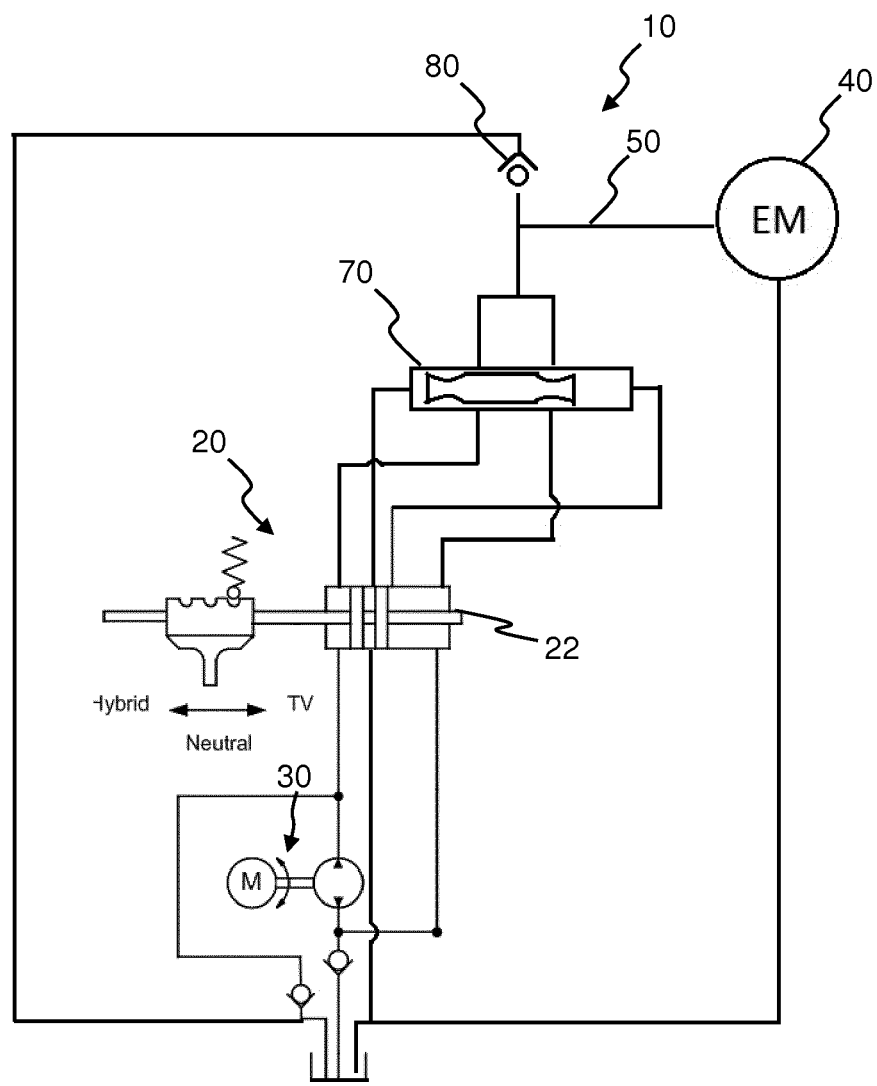
FIG. 2 is a schematic view of a hydraulic system according to another embodiment.

FIG. 2 shows an alternative embodiment of a hydraulic system 10 where the flow from the shifting piston 22 is used to control a pilot valve 70 for the cooling flow. By using a pilot valve 70 the openings for the cooling flow can be made larger and thus the pressure drop can be reduced compared to the system 10 shown in FIG. 1.

When the shifting piston 22 reaches its end position, as is shown in FIG. 2, control fluid for the pilot valve 70 is flown from the pump assembly 30 to the pilot valve 70 via the cylinder 24. Cooling fluid may consequently enter the cooling circuit 50 via the pilot valve 70. A floating air valve 80 may be arranged in the fluid circuit for preventing back flow from the pilot valve 70 to the tank.

Figure 3:
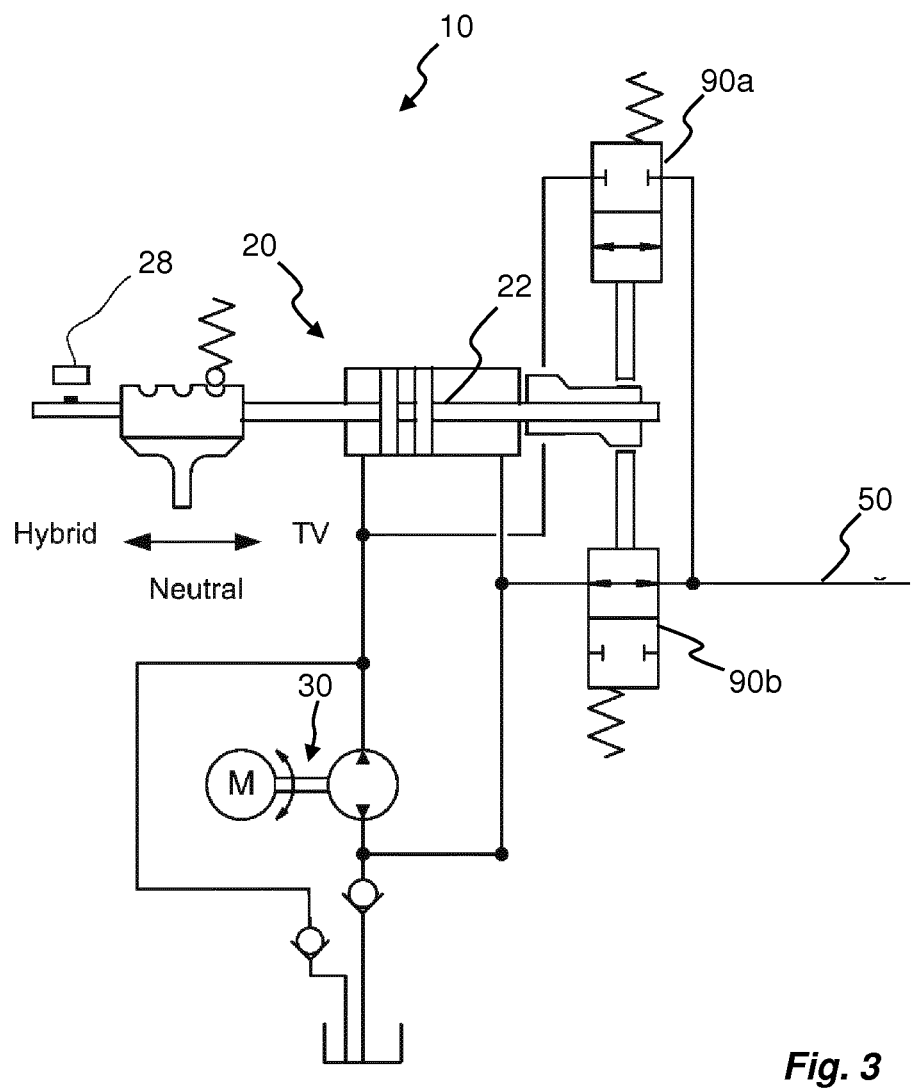
FIG. 3 is a schematic view of a hydraulic system according to an embodiment.

FIG. 3 shows a hydraulic system 10 similar to the hydraulic system of FIG. 2. Here the movement of the shifting piston 22 itself is used to actuate two valves 90a, 90b for controlling the cooling flow to the cooling circuit 50. As can be seen in FIG. 3, when the shifting piston 22 has reached its end position the valve 90b is automatically opened allowing fluid to enter the cooling circuit 50.

Figure 4:
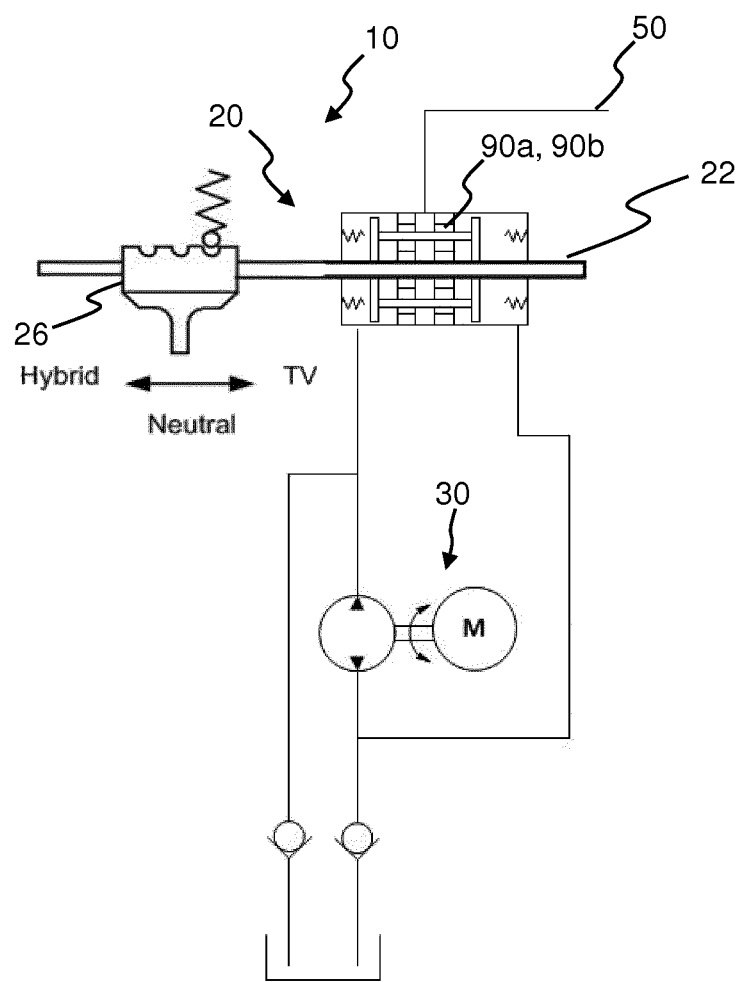
FIG. 4 is a schematic view of a hydraulic system according to a further embodiment.

FIG. 4 shows a hydraulic system 10 where the valves 90a, 90b for controlling the cooling flow to the cooling circuit 50 are integrated in the shifting piston 22.

Figure 5:
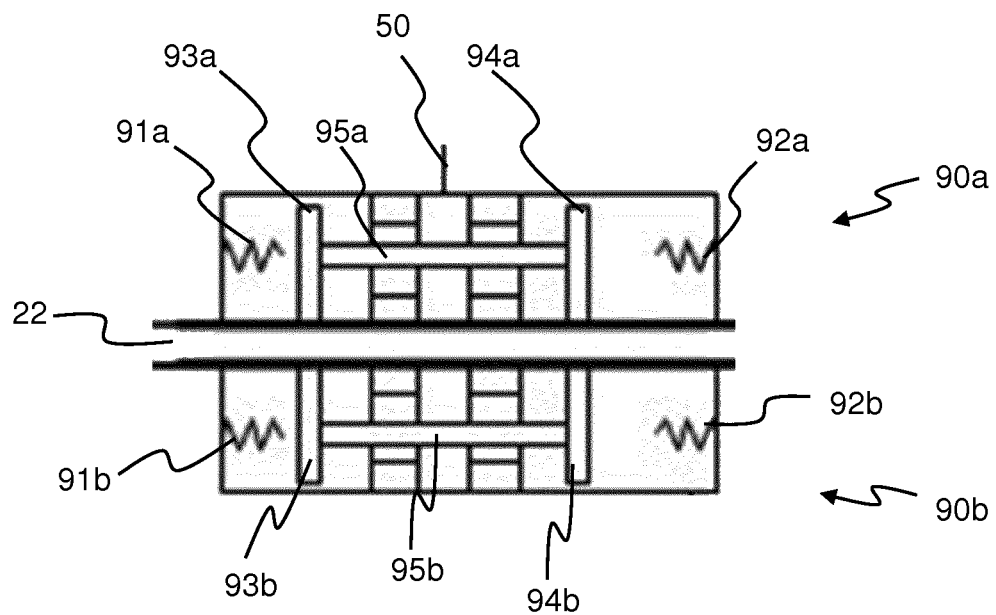
FIG. 5 is a cross-sectional view of two valves for use with a hydraulic system according to various embodiments.

The valves 90a, 90b are further shown in FIG. 5. Each valve comprises two valve springs 91a, 91b and two valve plates 93a, 93b located on a first side of the piston 22, e.g. the side facing the detention device 26. Furthermore, each valve comprises two valve springs 92a, 92b and two valve plates 94a, 94b located on a second side of the piston 22. The valve plates 93a, 94a, 93b, 94b on each valve 90a, 90b are connected to each other by a valve pin 95a, 95b.

When the system is in its hybrid mode, the pressure applied to the first side valve spring 91a, 91b and the first side valve plate 93a, 93b will press the valve plate 93a, 93b against the shifting piston 22, thus closing the cooling circuit 50. A further increase in pressure will lead to a movement of the shifting piston 22, thus moving the detention device 26 to the neutral mode. An even further increase in pressure will continue to move the shifting piston 22 towards its end position, which corresponds to the TV mode. When reaching TV mode the second side valve spring 91a, 91b is stretched, but the cooling circuit 50 is still blocked by the first side valve plate 93a, 93b. The pressure on the first side of the piston 22 is decreased, which results in that the first side valve spring 92a, 92b causes a movement of the valve plates 93a, 93b away from the shifting piston 22. Hence, the cooling circuit 50 is opened allowing fluid to enter.

By instead applying pressure to the second side valve spring 92a, 92b and the second side valve plate 94a, 94b when the system is in a neutral mode, the shifting piston 22 will move back in the opposite direction, thus moving the piston 22 towards the hybrid mode. Changing the pressure side causes a partial increase in reaction time, since the valve plates 93a, 93b first has to turn off the cooling circuit before the shifting piston 22 can be moved.

Figure 6:
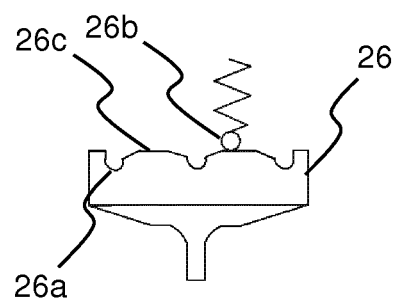
FIG. 6 is a side view of a detention device for use with a hydraulic system according to various embodiments.

The detention device 26 is further shown in FIG. 6. The detention device 26 preferably has grooves 26a for receiving a spring-biased ball 26b. The grooves 26a have shapes designed to form individual and separated distinct shift positions. In between those positions 26a the detention device 26 has a surface 26c that helps the movement of the shifting piston 22, as for example ramps.

To ensure good shifting quality and speed the movement of the shifting piston 22 can be monitored by a position sensor 28. In other embodiments the pump current can also be monitored as an alternative or in combination with a sensor 28 for redundancy.

Figure 7:
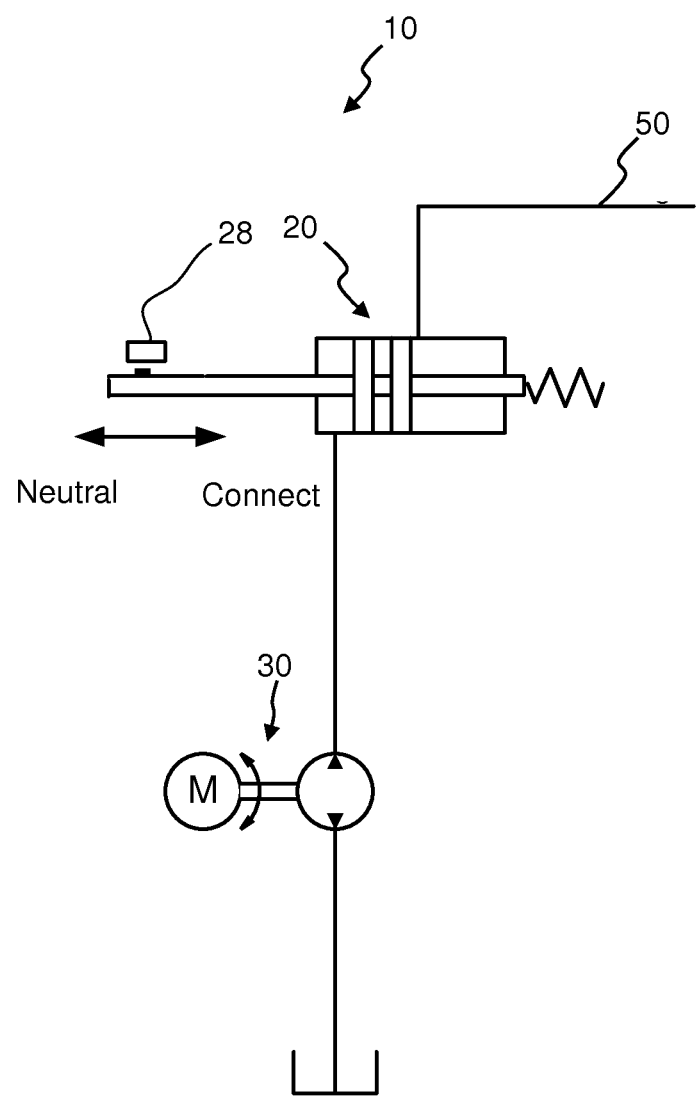
FIG. 7 is a schematic view of a hydraulic system according to an embodiment.

FIG. 7 shows a further embodiment of a hydraulic system 10 with a spring loaded shifting piston 22 allowing only two positions, for example a connected position when the pump 30 is running and a disconnected position when the pump 30 is shut off. The cooling circuit 50 is opened to allow fluid flow to the electrical motor (not shown) when the shifting piston 22 reaches its end position, as shown in FIG. 7.

The pump assembly 30 of FIG. 7 may preferably be of a type with high flow capacity and low pressure, as for example a gerotor pump.

The speed of the pump motor 32 and thereby the pump flow can be controlled as a function of the cooling effort momentarily needed by the electrical motor 40 and thereby reduce energy consumption when full flow is not needed.

Throughout this description cooling of the electrical motor 40 is conducted by means of an oil pump 30 pumping cooling hydraulic oil. The oil pump is driven by an electrical motor 32. The oil flow of the oil pump may be controlled by speed modulation and/or electrical or mechanical valves being positioned at different positions in the flow line to which the electrical motor 40 is connected. The cooling circuit 50 may further be arranged to provide cooling of power electronics used to power the electrical motor 40.

In an alternative embodiment, the stator, the windings, and or/the rotor of the torque vectoring device may be cooled directly by spraying oil thereon via the cooling circuit 50. Alternatively, an oil jacket or oil channels may be used in this regard.

In an embodiment, the hydraulic system comprises an oil/air or oil/water heat exchanger 60. The heat exchanger 60 may be integral with a housing 42 or other components of the electrical motor 40 or may be provided as a separate unit being operatively coupled to the cooling circuit 50.

In an embodiment, transmission and/or hypoid gears form part of the oil cooling circuit 50.

The active or present mode of the electrical motor 40 is preferably detected by a mode detection device, such as the position sensor 28, e.g. a hall, resolver, encoder, potentiometer, GMR, MR, or PLCD for detecting the active mode of the electrical motor 40.

In an embodiment, the mode detection device comprises a pressure sensor and/or a motor current/voltage/speed monitoring unit for detecting the active mode of the electrical motor 40.

For all the embodiments described above, the electrical motor 40 may be a switched reluctance motor (SRM). In principle such motor type can only supply a lower torque than asked for at a defect rotor position signal. At disruption of one or more phase conductors, total loss of the control electronics, or shortcut, an SRM motor will not supply any torque at all, which is of great advantage for the safety.

In another embodiment, the electrical motor 40 is an induction motor, e.g. such as a Squirrel-Cage Induction Motor (SCIM) or a Wound-Rotor Induction Motor (WRIM).

In an embodiment, the electrical motor 40 is a separately excited synchronous motor, also referred to as a wound rotor synchronous motor (WRSM).

In an embodiment, the electrical motor 40 is a variable reluctance motor or a synchronous reluctance motor, a permanent magnet motor, a brushless DC motor, or a DC motor. The electrical motor 40 is arranged with or without rotor position sensor feedback.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

The invention claimed is:

1. A hydraulic system for a vehicle, comprising
a shifting mechanism and a pump assembly configured to provide pressurized fluid to actuate said shifting mechanism, and
an electrical motor,
characterized in that
the movement of the shifting mechanism controls a valve function which serves to open a connection from the pump assembly to the electrical motor.

2. The hydraulic system according to claim 1, wherein the shifting mechanism comprises a moveable shifting piston such that the connection from the pump assembly to the electrical motor is opened only when the shifting piston has reached one of its end positions.

3. The hydraulic system according to claim 2, further comprising at least one separate valve being responsive to the movement of the shifting piston.

4. The hydraulic system according to claim 3, wherein the at least one separate valve is integrated in said shifting piston.

5. The hydraulic system according to claim 1, further comprising a pilot valve arranged between the shifting mechanism and the electrical motor.

6. The hydraulic system according to claim 5, wherein the pilot valve is configured to open when a shifting piston has reached one of its end positions.

7. The hydraulic system according to claim 1, wherein the pump assembly comprises a reversible pump.

8. The hydraulic system according to claim 1, wherein the shifting mechanism comprises a detention device for keeping the shifting mechanism at a desired shift position.

9. The hydraulic system according to claim 8, wherein the detention device comprises a plurality of distinct shift positions being separated by a ramped surface.

10. A vehicle driveline comprising a hydraulic system comprising
- a shifting mechanism and a pump assembly configured to provide pressurized fluid to actuate said shifting mechanism, and
- an electrical motor,
- characterized in that
- the movement of the shifting mechanism controls a valve function which serves to open a connection from the pump assembly to the electrical motor.

* * * * *